US008000404B2

(12) United States Patent
Talbot et al.

(10) Patent No.: US 8,000,404 B2
(45) Date of Patent: Aug. 16, 2011

(54) METHOD AND APPARATUS TO REDUCE THE EFFECT OF CROSSTALK IN A COMMUNICATIONS INTERFACE

(75) Inventors: Gerald R. Talbot, Concord, MA (US); Paul C. Miranda, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1223 days.

(21) Appl. No.: 11/627,586

(22) Filed: Jan. 26, 2007

(65) Prior Publication Data

US 2007/0230687 A1  Oct. 4, 2007

Related U.S. Application Data

(60) Provisional application No. 60/745,463, filed on Apr. 24, 2006, provisional application No. 60/786,546, filed on Mar. 28, 2006.

(51) Int. Cl.
*H04B 15/00* (2006.01)
(52) U.S. Cl. ........ 375/285; 375/220; 375/257; 375/367; 375/377; 327/141
(58) Field of Classification Search .................. 375/285, 375/220, 257, 267, 367, 377; 327/141
See application file for complete search history.

(56) References Cited

U.S. PATENT DOCUMENTS 7,561,625 B1 * 7/2009 Searles et al. ................. 375/257
2001/0008001 A1 7/2001 Suemura

FOREIGN PATENT DOCUMENTS

DE          2633516 A1    2/1978
EP          1701497 A     9/2006
WO          WO 99/29078   6/1999

OTHER PUBLICATIONS

"Linear feedback shift register", Wikipedia, the free encyclopedia, http://en.wikipedia.org/wiki/Linear_feedback_shift_register.*
Eetvelt, P. et al., "Peak to Average Power Reduction for OFDM Schemes by Selective Scrambling," Electronics Letters, vol. 32, No. 21, Oct. 10, 1996, 2 pages.
HyperTransportTM I/O Link Specification Revision 3.00, HyperTransport Technology Consortium, 428 pages, Apr. 21, 2006.
Choi, DooWhan, "Parallel Scrambling Techniques for Digital Multiplexers," AT&T Technical Journal, vol. 65, No. 5, Sep. 1, 1986, pp. 123-136.
International Search Report and Written Opinion, dated Nov. 6, 2007, for International Application No. PCT/US2007/007576, 11 pages.

* cited by examiner

*Primary Examiner* — David C. Payne
*Assistant Examiner* — Nader Bolourchi
(74) *Attorney, Agent, or Firm* — Zagorin O'Brien Graham LLP

(57) ABSTRACT

A technique for reducing crosstalk between communications paths includes scrambling data using scrambling functions that reduce or substantially minimize a probability that worst-case data patterns occur on communications paths adjacent to a potential victim communications path. In at least one embodiment of the invention, a method includes scrambling a plurality of data bits based at least in part on respective ones of a plurality of distinct combinations of one or more taps of a linear feedback shift register (LFSR). The plurality of data bits are scrambled for transmission during a first bit-time on corresponding ones of a plurality of adjacent communications paths.

22 Claims, 5 Drawing Sheets

|  | CAD[0] | CAD[1] | CAD[2] | CAD[3] | CLK | CAD[4] | CAD[5] | CAD[6] | CAD[7] | CTL |
|---|---|---|---|---|---|---|---|---|---|---|
| bit-time 0 | $x^{13} \wedge x^{18}$ | $x^{10} \wedge x^{17}$ | $x^{12} \wedge x^{16}$ | $x^{8} \wedge x^{16}$ | none | $x^{9} \wedge x^{15}$ | $x^{9} \wedge x^{18}$ | $x^{11} \wedge x^{13}$ | $x^{11} \wedge x^{14}$ | $x^{13} \wedge x^{14}$ |
| bit-time 1 | $x^{12} \wedge x^{17}$ | $x^{9} \wedge x^{16}$ | $x^{11} \wedge x^{15}$ | $x^{7} \wedge x^{15}$ |  | $x^{8} \wedge x^{14}$ | $x^{8} \wedge x^{17}$ | $x^{10} \wedge x^{12}$ | $x^{10} \wedge x^{13}$ | $x^{12} \wedge x^{13}$ |
| bit-time 2 | $x^{11} \wedge x^{16}$ | $x^{8} \wedge x^{15}$ | $x^{10} \wedge x^{14}$ | $x^{6} \wedge x^{14}$ |  | $x^{7} \wedge x^{13}$ | $x^{7} \wedge x^{16}$ | $x^{9} \wedge x^{11}$ | $x^{9} \wedge x^{12}$ | $x^{11} \wedge x^{12}$ |
| bit-time 3 | $x^{10} \wedge x^{15}$ | $x^{7} \wedge x^{14}$ | $x^{9} \wedge x^{13}$ | $x^{5} \wedge x^{13}$ |  | $x^{6} \wedge x^{12}$ | $x^{6} \wedge x^{15}$ | $x^{8} \wedge x^{10}$ | $x^{8} \wedge x^{11}$ | $x^{10} \wedge x^{11}$ |
| bit-time 4 | $x^{9} \wedge x^{14}$ | $x^{6} \wedge x^{13}$ | $x^{8} \wedge x^{12}$ | $x^{4} \wedge x^{12}$ |  | $x^{5} \wedge x^{11}$ | $x^{5} \wedge x^{14}$ | $x^{7} \wedge x^{9}$ | $x^{7} \wedge x^{10}$ | $x^{9} \wedge x^{10}$ |
| bit-time 5 | $x^{8} \wedge x^{13}$ | $x^{5} \wedge x^{12}$ | $x^{7} \wedge x^{11}$ | $x^{3} \wedge x^{11}$ |  | $x^{4} \wedge x^{10}$ | $x^{4} \wedge x^{13}$ | $x^{6} \wedge x^{8}$ | $x^{6} \wedge x^{9}$ | $x^{8} \wedge x^{9}$ |
| bit-time 6 | $x^{7} \wedge x^{12}$ | $x^{4} \wedge x^{11}$ | $x^{6} \wedge x^{10}$ | $x^{2} \wedge x^{10}$ |  | $x^{3} \wedge x^{9}$ | $x^{3} \wedge x^{12}$ | $x^{5} \wedge x^{7}$ | $x^{5} \wedge x^{8}$ | $x^{7} \wedge x^{8}$ |
| bit-time 7 | $x^{6} \wedge x^{11}$ | $x^{3} \wedge x^{10}$ | $x^{5} \wedge x^{9}$ | $x^{1} \wedge x^{9}$ |  | $x^{2} \wedge x^{8}$ | $x^{2} \wedge x^{11}$ | $x^{4} \wedge x^{6}$ | $x^{4} \wedge x^{7}$ | $x^{6} \wedge x^{7}$ |

FIG. 5

METHOD AND APPARATUS TO REDUCE THE EFFECT OF CROSSTALK IN A COMMUNICATIONS INTERFACE

CROSS-REFERENCE TO RELATED APPLICATION(S)

This application claims benefit under 35 U.S.C. §119 of provisional application No. 60/786,546, filed Mar. 28, 2006, entitled "Method and Apparatus for Link Operations," naming Gerry R. Talbot, Paul Miranda, Mark D. Hummel, William A. Hughes, and Larry D. Hewitt as inventors, which application is incorporated by reference herein. This application also claims benefit under 35 U.S.C. §119 of provisional application No. 60/745,463, filed Apr. 24, 2006, entitled "Method and Apparatus to Reduce the Effect of Crosstalk in a Communications Interface," naming Gerald R. Talbot and Paul C. Miranda as inventors, which application is incorporated by reference herein.

BACKGROUND

1. Field of the Invention

This application is related to integrated circuits and more particularly to data communications links between integrated circuits.

2. Description of the Related Art

Noise in an electronic system may cause a signal to deviate from its intended or ideal value. Exemplary noise sources include power supply bounce due to simultaneous switching, crosstalk between signal lines, and electromagnetic energy produced by other sources. Crosstalk between signal lines may occur when communications paths (e.g., traces on a printed circuit board) are physically located within close proximity of each other and may introduce noise that adversely affects a signal on a communications path (i.e., a victim communications path) and results in erroneous operation of an electronic system.

SUMMARY

A technique for reducing crosstalk between adjacent communications paths includes scrambling data using scrambling functions that reduce or substantially minimize a probability that worst-case data patterns occur on the adjacent communications paths. In at least one embodiment of the invention, a method includes scrambling a plurality of data bits based at least in part on respective ones of a plurality of distinct combinations of one or more taps of a linear feedback shift register (LFSR). The plurality of data bits are scrambled for transmission during a first bit-time on corresponding ones of a plurality of adjacent communications paths.

In at least one embodiment of the invention, an apparatus includes a plurality of adjacent communications paths and a scrambling circuit associated with the plurality of adjacent communications paths. The scrambling circuit includes a linear feedback shift register (LFSR) and a plurality of logic circuits responsive to respective ones of a plurality of distinct combinations of one or more taps of the LFSR. The scrambling circuit is responsive to corresponding ones of a plurality of data bits for transmission during a first bit-time on corresponding ones of a plurality of adjacent communications paths to generate a plurality of scrambled data signals.

BRIEF DESCRIPTION OF THE DRAWINGS

The present invention may be better understood, and its numerous objects, features, and advantages made apparent to those skilled in the art by referencing the accompanying drawings.

FIG. 5 illustrates exemplary taps of the LFSR of FIG. 4 used to generate scramble patterns for a plurality of bit-times of data for transmission on respective ones of a plurality of communications paths and consistent with one or more embodiments of the present invention.

The use of the same reference symbols in different drawings indicates similar or identical items.

DESCRIPTION OF THE PREFERRED EMBODIMENT(S)

Figure 1:
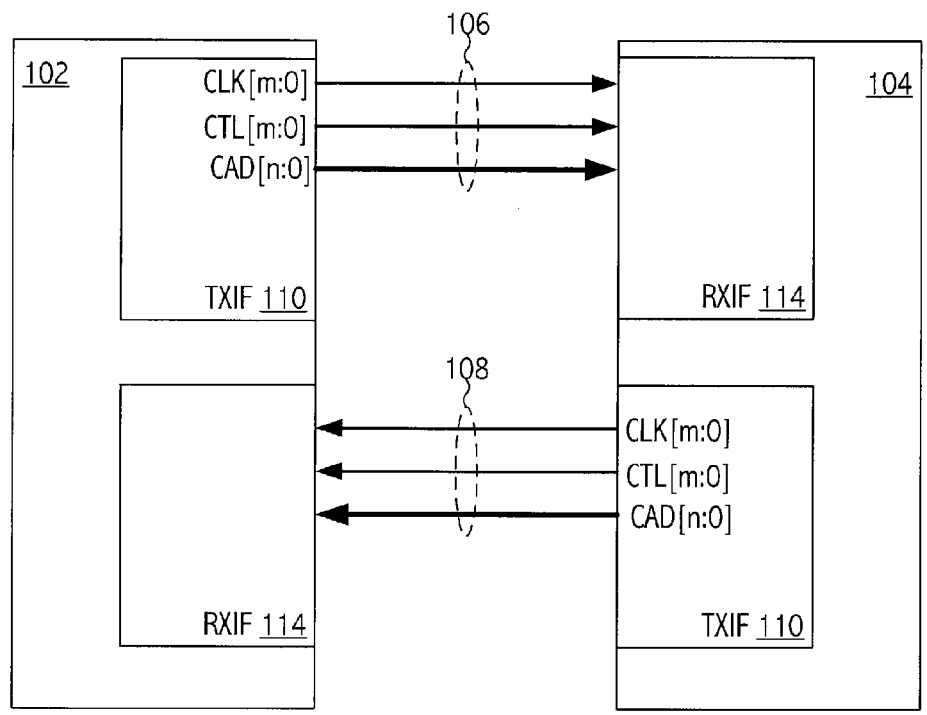
FIG. 1 illustrates a block diagram of two integrated circuit devices coupled by a communications link consistent with one or more embodiments of the present invention.

Referring to FIG. 1, integrated circuit 102 communicates with integrated circuit 104 by an exemplary communications link including transmit interfaces 110, receive interfaces 114, and communications paths 106 and 108, which include respective, individual communications paths for clock signals (e.g., CLK[m:0]), control signals (e.g., CTL[m:0]), and data signals (e.g., n-bits of commands, addresses, or data, i.e., CAD[n:0]). Those individual communications paths may be single-ended or differential communications paths. In at least one embodiment of the invention, a bit-time is half a clock period in duration, i.e., two data bits (e.g., two CAD[n:0] bits or two CTL[m:0] bits) are transmitted on a corresponding communications path per clock cycle (e.g., a period of a respective one of CLK[m:0]). However, the teachings herein may be adapted for bit-times having one clock period in duration (i.e., one data bit is transmitted on a corresponding communications path per clock cycle) or for other suitable bit-time durations. Communications paths 106 and 108 are unidirectional, i.e., communications path 106 provides a path from integrated circuit 102 to integrated circuit 104 and communications path 108 provides a path to integrated circuit 102 from integrated circuit 104.

Data transmitted across either communications paths 106 or communications paths 108 over multiple bit-times may produce data sequences that introduce crosstalk noise into a victim one of the communications paths from adjacent communications paths. Such crosstalk noise may cause the victim communications path to erroneously change states, either by causing a non-transitioning signal on the victim communications path to transition (e.g., the signal on the victim communications path has a state opposite to a final state of a transition signals on other adjacent communications paths), by preventing a transitioning signal on a victim communications path from actually transitioning (e.g., signals on the victim communications path and other adjacent communications paths transition to opposite states), or by moving the time a signal transition occurs, which may cause the receiver to incorrectly sample the data value. Thus, crosstalk can affect both the height and width of the received data eye.

Figure 2:
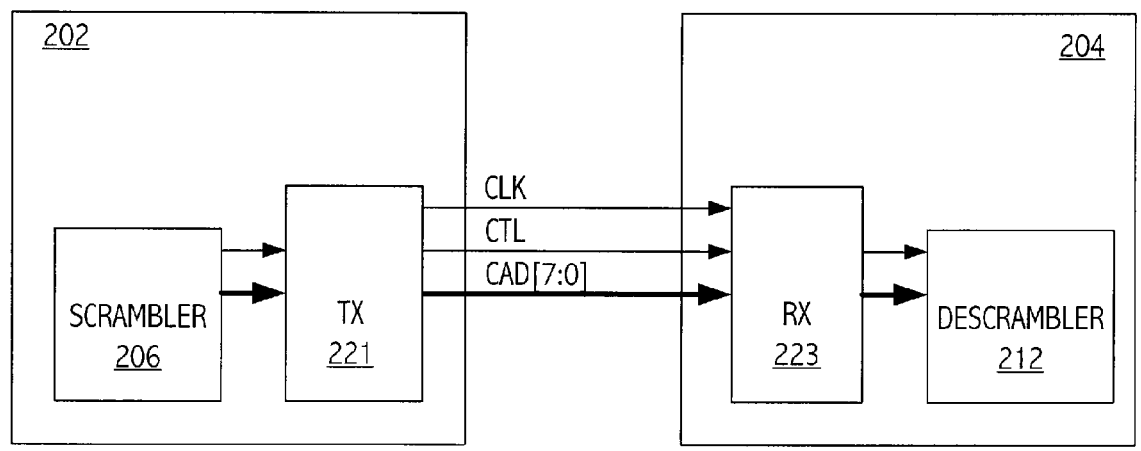
FIG. 2 illustrates a block diagram of portions of an exemplary communications link consistent with one or more embodiments of the present invention.

Referring to FIG. 2, scrambling techniques may be used to reduce effects of crosstalk on communications paths. An exemplary transmit interface (e.g., transmit interface 202) may include a scrambler circuit (e.g., scrambler circuit 206) that scrambles data prior to being transmitted on communications paths. In at least one embodiment of transmit interface 202, the scrambling operation is followed by other exemplary transmit operations (e.g., transmitter circuits 221 may perform signal encoding, signal level shifting, or other appropriate signal processing operations). The transmitted signals are received by an exemplary receive interface (e.g., receive interface 204), which performs exemplary receive operations (e.g., receive circuits 223 may perform signal equalization, signal level shifting, signal decoding, or other appropriate signal processing functions) prior to descrambling the data by a descrambler circuit (e.g., descrambler circuit 212).

One technique for reducing noise on differential communications paths scrambles data to introduce crosstalk noise into a victim differential communications path as common mode noise. For example, a scrambler circuit may scramble data for transmission on differential communications paths directly adjacent to a victim differential communications path based on scrambling functions that are inverses of each other. By using inverse scrambling functions on the communications paths adjacent to the victim differential communications path, both communications paths (i.e., the inverting and non-inverting communications paths) of the victim differential communications path may be affected substantially equally by crosstalk noise introduced by the adjacent communications paths.

Rather than the scrambling functions applied to the communications paths adjacent to a particular victim differential communications path being inverses of each other, the same effect may be achieved by scrambling functions for the communications paths adjacent to a particular victim communications path being identical, but reversing the polarity of the differential signals on one of the differential communications paths adjacent to the victim differential communications path. Thus, crosstalk noise introduced by the communications paths adjacent to the victim differential communications path may be common mode noise that may be rejected by the receiver. However, in at least one application, routing of the adjacent differential communications paths on a printed circuit board may result in amounts of skew between signals on these paths that prevent this technique from introducing crosstalk as common mode noise on the victim differential communications path. Skew specifications that guarantee introducing crosstalk noise into a victim differential communications path as common mode noise may be impractical in some applications.

Another technique for addressing crosstalk in adjacent communications paths scrambles data to provide statistical relief for crosstalk noise. That is, the scrambling operation reduces the likelihood that conditions occur that introduce crosstalk noise as compared to communications interfaces that do not apply this scrambling operation to signals communicated on adjacent communications paths. By reducing or substantially minimizing a probability that worst-case data patterns occur on the adjacent communications paths, the effect of crosstalk noise may be substantially reduced. Worst-case data patterns are those data patterns that couple a substantial amount of energy into a victim communications path, as compared to the energy coupled into a victim communications path by other data patterns. An example of a worst-case data pattern is one in which all of the lines adjacent to a particular victim line switch at the same time in a direction opposite to the state of the victim line.

Scrambling functions that provide such statistical relief by reducing the probability that worst-case data patterns occur, reduce the effect of crosstalk on the data eye and increase the data eye area as compared to other interfaces that do not use this scrambling technique. The data eye may be defined by modeling the probability that the data eye is a particular height and width (i.e., using probability density functions for height and width of the data eye that model the likelihood that the data eye has a particular size). The scrambling functions consistent with the present invention increase or substantially maximize the data eye area associated with the individual ones of the adjacent communications paths at given bit error rates or ratios (BERs) for the individual communications paths. In addition, the scrambling technique consistent with the present invention may reduce RF interference. For example, an interface may send repeated NOPs on idle communications paths. Without scrambling, that data sequence may create tones that can radiate from the communications paths. Scrambling the data transmitted on idle communications paths may reduce or substantially remove these tones.

Figure 3:
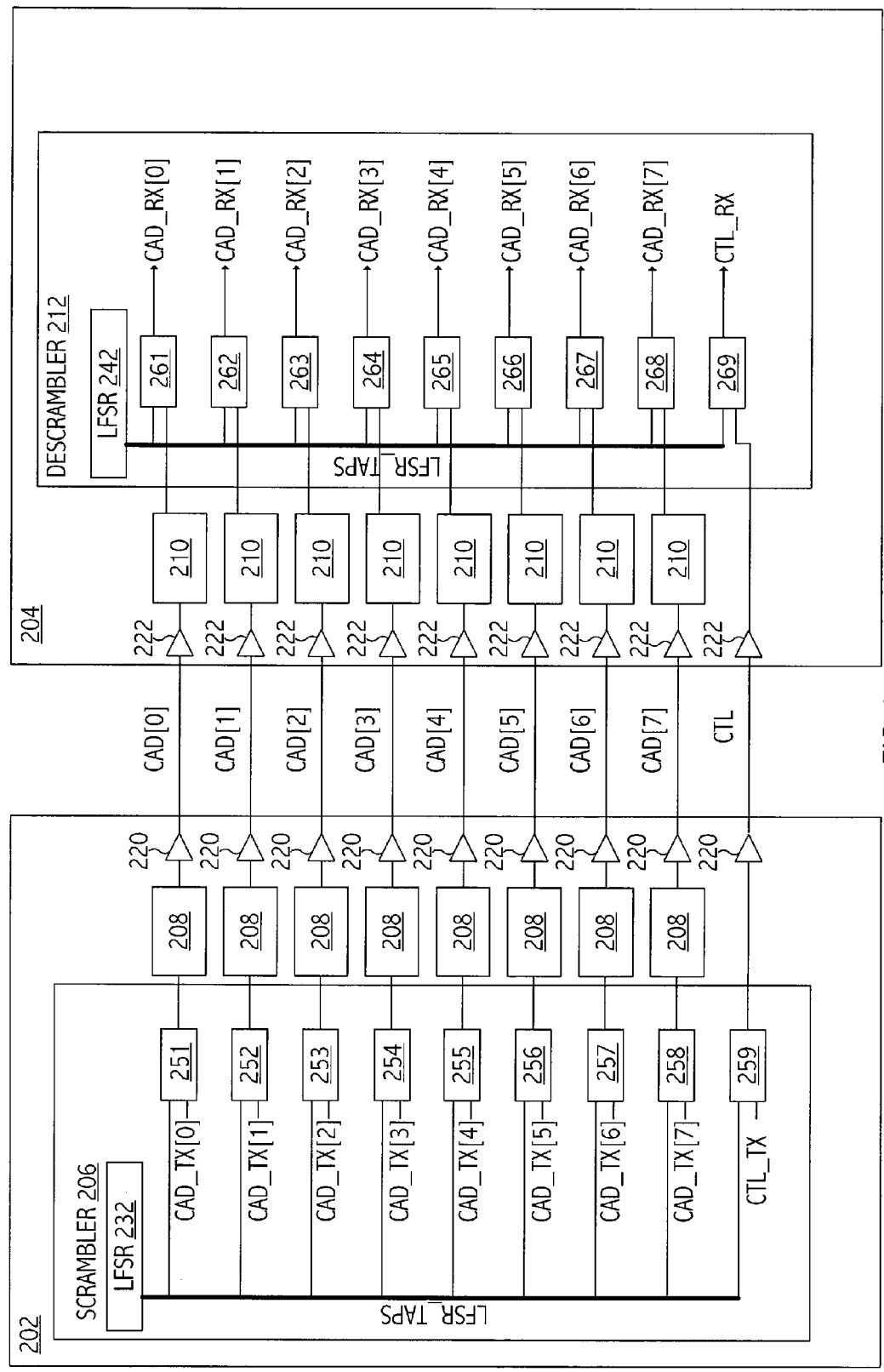
FIG. 3 illustrates a block diagram of portions of an exemplary communications link consistent with one or more embodiments of the present invention.

Referring to FIG. 3, transmit interface 202 includes an exemplary scrambler circuit that implements scrambling functions that provide statistical relief from crosstalk (e.g., scrambler circuit 206). LFSR 232 is a linear feedback shift register (i.e., LFSR) responsive to an input bit that is a linear function of the current state of the LFSR. The input bit is driven by the exclusive-or (i.e., xor) of bits of the overall shift register value (i.e., taps). An initial value of an LFSR is called the "seed". The operation of an LFSR is deterministic, i.e., the sequence of values produced by the LFSR for its next state is completely determined by its current state. Since an LFSR has a finite number of possible states, it eventually enters a repeating cycle. However, the feedback function of an LFSR can be chosen to cause the LFSR to produce a sequence of bits that appears random and has a long cycle. As referred to herein, the "taps" of an LFSR refers to the individual bits of the LFSR that are coupled to generate the next state of the LFSR and also refers to those individual bits of the LFSR that are used by scrambling functions of scrambler circuit 206. The list of the bit positions that affect the next state of an LFSR is called the "tap sequence." Typically, the tap sequence of an LFSR is represented as a polynomial modulo 2 (i.e., the coefficients of the polynomial must be 1's or 0's). This is called the "feedback polynomial" or "characteristic polynomial." The powers of the terms of the characteristic polynomial typically represent tapped bits, counting from the left. The last bit of an LFSR is referred to herein as the "output" of the LFSR.

Figure 4:
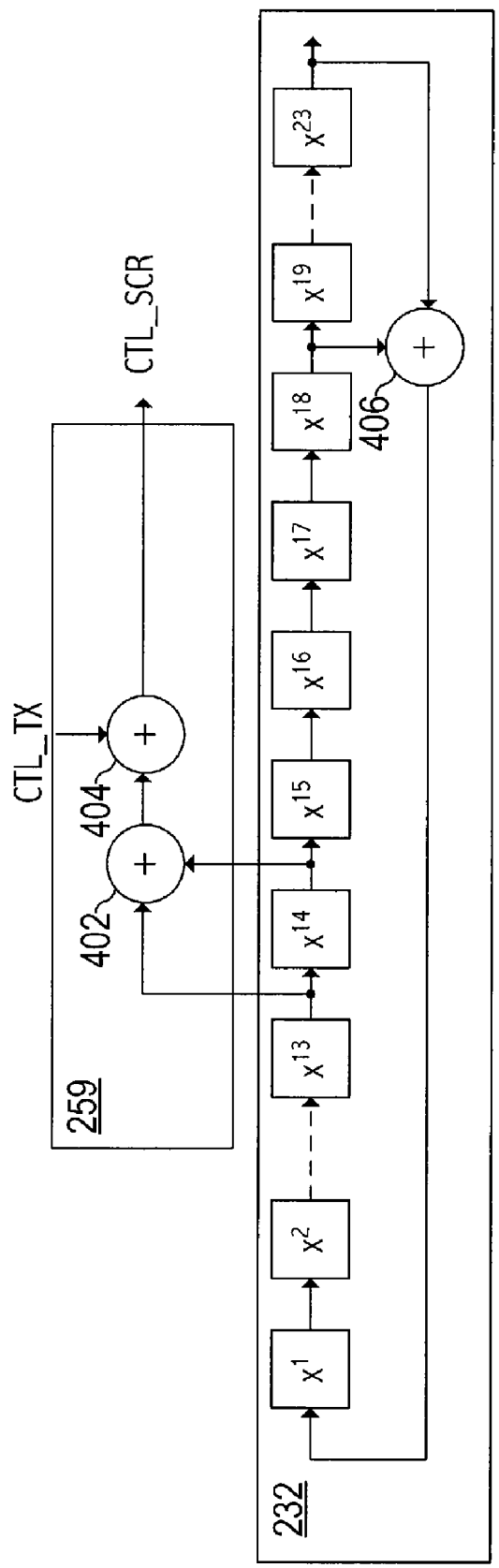
FIG. 4 illustrates a block diagram of an exemplary linear feedback shift register (LFSR) consistent with one or more embodiments of the present invention.

Referring to FIG. 4, an exemplary LFSR (e.g., LFSR 232), consistent with the scrambling technique described herein, is a 23-bit LFSR. In at least one embodiment of LFSR 232, the taps are the 23rd and 18th bits. The resulting LFSR characteristic polynomial is $x^{23}+x^{18}+1$. Tap 23 is xored with tap 18 (e.g., by xor 406), the result being fed back to the input of LFSR 232. Note that LFSR 232 is exemplary only and the choice of an LFSR characteristic polynomial may be dependent on the communications interface in which this scrambling technique operates.

Referring back to FIG. 3, individual taps (e.g., LFSR_TAPS) of LFSR 232 are coupled to logic circuits 251, 252, ..., 259. Taps may be chosen to reduce or substantially minimize the correlation between sequences on adjacent lanes and to provide enough transition density on each lane to ensure clock and data recovery. The particular taps for a given application may be determined by any suitable technique. For example, suitable characteristic polynomials and associated taps may be determined by modeling particular scrambling functions based on particular characteristic polynomials and tap combinations and by performing a correlation between the scrambled data patterns generated by these exemplary scrambling functions. Logic circuits 251, 252, ..., 259, which are associated with respective ones of communications paths for CAD[0], CAD[1], ..., CAD[7], and CTL, perform logical functions on distinct combinations of one or more of the individual taps of LFSR 232. In at least one embodiment of scrambler circuit 202, logic circuits 251, 252, ..., 259 perform an xor of two taps of LFSR 232, the result of which is then xored with respective data bits for transmission to form scrambled data signals. The scrambled data signals may then be encoded (e.g., by encoding circuits 208). The scrambled and, in some cases, encoded signals are then transmitted on respective communications paths by transmitter circuits (e.g., transmitter circuits 220). Transmitter circuits 220 may perform signal level shifting or other appropriate signal processing operations.

Referring to FIG. 4, in at least one embodiment of scrambler circuit 202, LFSR 232 implements a characteristic polynomial of $x^{23}+x^{18}+1$. Exemplary logic circuit 259, which is associated with the CTL communications path, receives taps 13 and 14 from LFSR 232, which are xored (e.g., by xor circuit 402), the result of which is xored (e.g., by xor circuit 404) with the data for transmission on the CTL communications path (e.g., CTL_TX) to generate scrambled data (e.g., CTL_SCR) for further transmit processing and transmission on the CTL communications path. Note that in other applications and/or configurations of the communications interface, LFSR 232 may implement other characteristic polynomials and scrambler circuit 206 may implement scrambling functions based on other combinations of taps to reduce or substantially minimize the likelihood of crosstalk noise.

Referring back to FIG. 3, in at least one embodiment of the invention, logic circuits 251, 252, ..., 259 receive taps and data associated with additional bit-times. For example, logic circuits 251, 252, ..., 259 may provide scrambled data associated with multiple (e.g., eight) bit-times to encoders 208. Accordingly, logic circuits 251, 252, ..., 259 receive respective taps for eight bit-times of data (e.g., taps for bit-times 0 through 7, as illustrated in FIG. 5) and output eight scrambled bits of data. Note that LFSR 232 must shift by the number of bit-times processed in one clock cycle and taps may be selected accordingly. For example, to reduce complexity, taps for additional bit-times are associated with states of the current LFSR state and scrambling functions for bit-time 0 do not include taps that would require computing a portion of the next LFSR state for additional bit times. Referring to FIG. 5, the table of scrambler taps includes taps for processing eight bit-times in one clock cycle. Thus, the scrambling functions for bit-time 0 do not include taps $x^1$ through $x^7$ and LFSR 232 shifts by eight bits each clock cycle.

Referring back to FIG. 3, receiver circuits 222 of receive interface 204 may perform signal equalization, signal level shifting, noise reduction, or other appropriate signal processing functions on signals received via communications paths CAD[0:7] and CTL. Decoder circuits 210 perform operations that are inverses of the encoding operations performed by encoder circuits 208. The received, and in some cases decoded, scrambled signals are then received by logic circuits 261, 262, ..., 269, which perform respective descrambling operations that are the inverse of the scrambling operations performed by scrambler circuit 206. Accordingly, descrambler circuit 212 includes LFSR 242, which is another instantiation of LFSR 232 (i.e., LFSR 242 implements the same polynomial as LFSR 232).

In addition, LFSR 232 and LFSR 242 are synchronized, i.e., they are initialized with the same seed value and are operated to have the same state and provide the same output for particular bit-times. This synchronization typically occurs during training of the interface, prior to data transmission on the communications paths, using any suitable synchronization technique. In at least one embodiment of the invention, LFSRs 232 and 242 are initialized with a predetermined value (e.g., all ones) after each reset or interface disconnect. LSFRs 232 and 242 hold this predetermined value until the end of a training sequence. LFSRs 232 and 242 begin shifting the first time the interface uses scrambling, e.g., a first bit-time is sent by the interface. Accordingly, logic circuits 261, 262, ..., 269 of descrambler circuit 212 receive LFSR taps according to the table in FIG. 5, having the same states as scrambler circuit 206, with respect to a particular bit-time. Thus, by xoring the received scrambled data with the combination of taps associated with a particular bit-time and communications path, the data is recovered by descrambler 212. Note that initialization and synchronization procedures are implementation specific and may depend on particular interface protocols.

Figure 6:
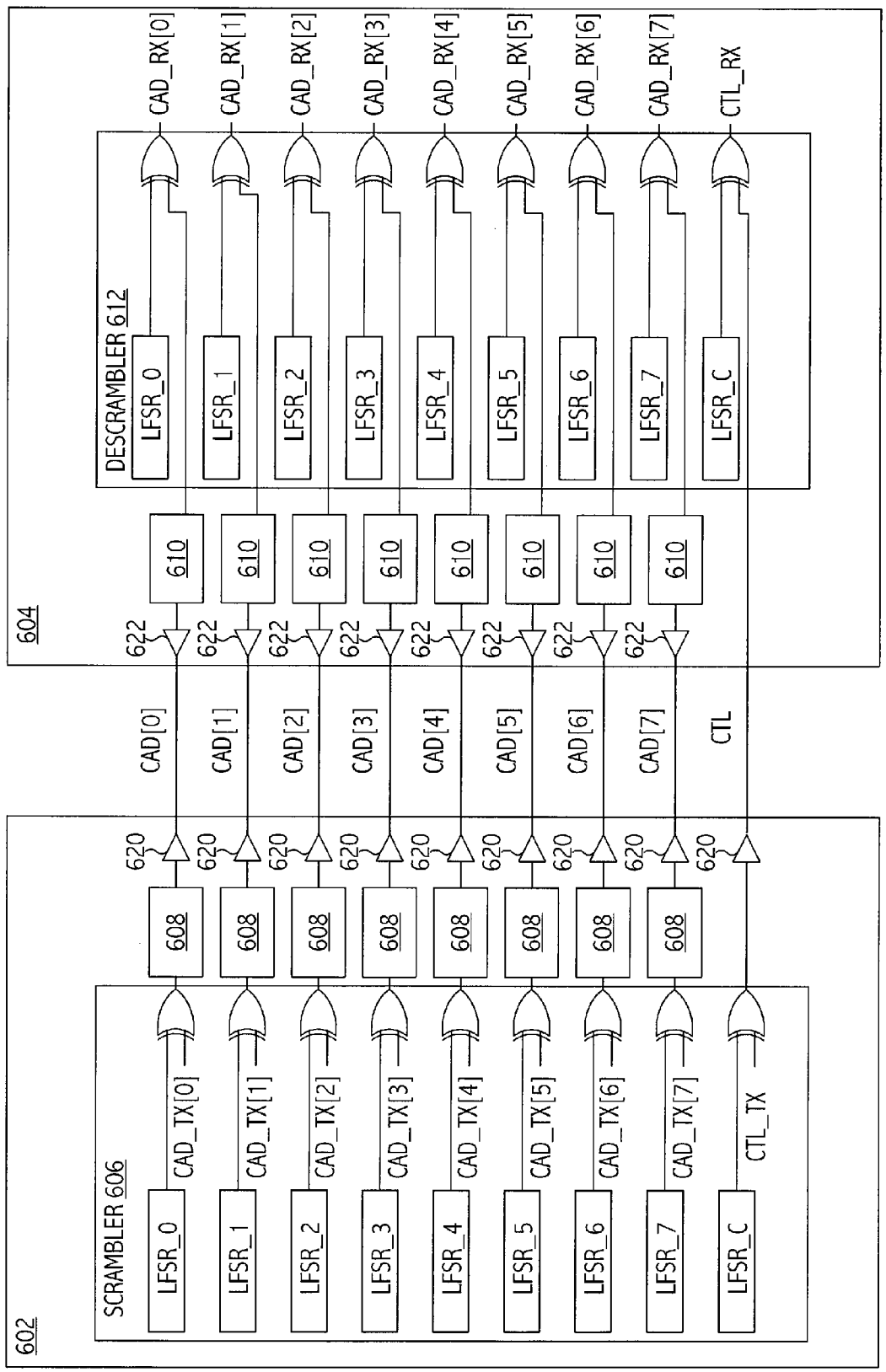
FIG. 6 illustrates a block diagram of portions of an exemplary communications link consistent with one or more embodiments of the present invention.

Referring to FIG. 6, in at least one embodiment, transmit interface 602 includes scrambler circuit 606, which implements scrambling functions that provide statistical relief from crosstalk. Outputs of individual LFSRs (e.g., LFSR_0, LFSR_1, ..., LFSR_7, and LFSR_C) are coupled to be xored with respective ones of data bits CAD_TX[0], CAD_TX[1], ..., CAD_TX[7], and CTL_TX. LFSR_0, LFSR_1, ..., LFSR_7, and LFSR_C implement polynomial functions that are chosen to provide statistical relief from crosstalk, as described above with regard to FIGS. 3-5. In at least one embodiment of the invention, LFSR_0, LFSR_1, ..., LFSR_7 and LFSR_C implement the same polynomial function, but are initialized with different seed values. The seed values are chosen to reduce or substantially minimize the crosstalk on communications paths CAD[0], CAD[1], ..., CAD[7], and CTL.

The scrambled and, in some cases, encoded signals (e.g., signals encoded by encoder circuits 208) may be transmitted on respective communications paths by transmitter circuits (e.g., transmitter circuits 620), which perform appropriate signal processing operations. Receiver circuits 622 of receive interface 604 may perform signal equalization, signal level shifting, noise reduction, or other appropriate signal processing functions on signals received via communications paths CAD[0:7] and CTL. Decoder circuits 610 perform operations that are inverses of the encoding operations performed by encoder circuits 608. The received, and in some cases decoded, scrambled signals are then xored with the output of individual LFSR_0, LFSR_1, ..., LFSR_7, and LFSR_C, which are instantiations of LFSR_0, LFSR_1, ..., LFSR_7, and LFSR_C of scrambler circuit 606 (i.e., LFSR_0, LFSR_1, ..., LFSR_7, and LFSR_C in the scrambler circuit implement the same polynomial as LFSR_0, LFSR_1, ..., LFSR_7, and LFSR_C in the descrambler circuit and respective ones of these LFSRs in the scrambler circuit and descrambler circuit are initialized with the same seed values).

In addition, LFSR_0, LFSR_1, ..., LFSR_7, and LFSR_C in scrambler circuit 606 are synchronized with respective ones of, LFSR_0, LFSR_1, ..., LFSR_7, and LFSR_C in descrambler circuit 612, i.e., respective ones of the LFSRs receive the same seed value and are operated to provide the same outputs for particular bit-times. This synchronization typically occurs during a training sequence of the interface, prior to data transmission on the communications paths, using any suitable synchronization technique. By xoring the received scrambled data with the output of an associated LFSR for a particular bit-time, the data may be recovered by descrambler circuit 612. Accordingly, descrambler circuit 612 performs a descrambling operation that is the inverse of the scrambling operation performed by scrambler circuit 606 and descrambler circuit 612 recovers the data scrambled by scrambler circuit 606.

The description of the invention set forth herein is illustrative, and is not intended to limit the scope of the invention as set forth in the following claims. For example, while the invention has been described in an embodiment in which data is transmitted from the transmit interface of one integrated circuit to the receive interface of another integrated circuit across a plurality of adjacent communications paths, one of skill in the art will appreciate that the teachings herein can be utilized in a loopback mode, i.e., data is transmitted from the transmit interface of an integrated circuit to the receive interface of the same integrated circuit. Variations and modifications of the embodiments disclosed herein, may be made based on the description set forth herein, without departing from the scope and spirit of the invention as set forth in the following claims.

What is claimed is:

1. A method comprising:
   scrambling a plurality of data bits based at least in part on respective ones of a plurality of distinct combinations of one or more taps of a linear feedback shift register (LFSR), the plurality of data bits being scrambled for transmission in parallel to a descrambling circuit during a first bit-time on corresponding ones of a plurality of adjacent communications paths,
   wherein the plurality of distinct combinations of one or more taps substantially minimize a probability that worst case data patterns occur on the plurality of adjacent communications paths with respect to individual ones of the plurality of adjacent communications paths being victims of crosstalk from others of the plurality of adjacent communications paths.

2. The method, as recited in claim 1, wherein the LFSR includes 23 taps and represents a polynomial function of $x^{23}+x^{18}+1$.

3. The method, as recited in claim 1, wherein individual ones of the plurality of distinct combinations of one or more taps include an exclusive-or of two individual taps of the LFSR.

4. The method, as recited in claim 1, wherein the LFSR includes 23 taps, the plurality of transmission lines includes nine transmission lines, and the plurality of distinct combinations of one or more taps include logical functions of taps 13 and 18, taps 10 and 17, taps 12 and 16, taps 8 and 16, taps 9 and 15, taps 9 and 18, taps 11 and 13, taps 11 and 14, and taps 13 and 14.

5. The method, as recited in claim 1, wherein scrambling the plurality of data bits includes performing exclusive-ors of respective ones of the plurality of data bits with corresponding ones of the plurality of distinct combinations.

6. The method, as recited in claim 1, further comprising:
   scrambling, concurrently with the scrambling of the plurality of data bits, at least one additional plurality of data bits associated with at least one additional bit-time subsequent to the first bit time,
   wherein the scrambling the additional plurality of bits is based at least in part on individual ones of the plurality of distinct combinations of one or more taps of the LFSR corresponding to the additional bit time, the additional plurality of data bits being scrambled for transmission during the additional bit-time on corresponding ones of the plurality of adjacent communications paths.

7. The method, as recited in claim 1, further comprising:
   descrambling a plurality of signals based at least in part on respective ones of the plurality of distinct combinations of one or more taps, the plurality of distinct combinations of one or more taps being generated by another instantiation of the LFSR, the plurality of signals being associated with corresponding ones of the plurality of adjacent communications paths and being descrambled during the first bit-time, thereby recovering the plurality of data bits.

8. The method, as recited in claim 7, further comprising:
   synchronizing the LFSR to the other instantiation of the LFSR, wherein the scrambling is performed on a first integrated circuit and the descrambling is performed on a second integrated circuit, the first integrated circuit being coupled to the second integrated circuit by the plurality of adjacent communications paths.

9. An apparatus comprising:
   a plurality of adjacent communications paths; and
   a scrambling circuit associated with the plurality of adjacent communications paths, the scrambling circuit comprising:
   a linear feedback shift register (LFSR); and
   a plurality of logic circuits responsive to respective ones of a plurality of distinct combinations of one or more taps of the LFSR and responsive to corresponding ones of a plurality of data bits for transmission in parallel to a descrambling circuit during a first bit-time on corresponding ones of a plurality of adjacent communications paths to generate a plurality of scrambled data signals,
   wherein the plurality of distinct combinations of taps substantially minimize a probability that worst case data patterns occur on the plurality of adjacent communications paths with respect to individual ones of the plurality of adjacent communications paths being victims of crosstalk from others of the plurality of adjacent communications paths.

10. The apparatus, as recited in claim 9, further comprising:
    a descrambling circuit associated with the plurality of adjacent communications paths,
    wherein the descrambling circuit comprises:
    an additional instantiation of the LFSR; and
    a plurality of logic circuits responsive to respective ones of a plurality of signals and responsive to respective ones of the plurality of distinct combinations of one or more taps, the plurality of distinct combinations of one or more taps being generated by the additional instantiation of the LFSR, the plurality of signals being associated with corresponding ones of the plurality of adjacent communications paths and being descrambled during the first bit-time, thereby recovering the plurality of data bits.

11. The apparatus, as recited in claim 9, wherein the LFSR includes 23 taps and represents a polynomial function of $x^{23}+x^{18}+1$.

12. The apparatus, as recited in claim 9, wherein individual ones of the plurality of corresponding distinct combinations of one or more taps include an exclusive-or of two distinct taps of the LFSR.

13. The apparatus, as recited in claim 9, wherein the LFSR includes 23 taps, the plurality of transmission lines includes nine transmission lines, and the plurality of distinct combinations of one or more taps include logical functions of taps 13 and 18, taps 10 and 17, taps 12 and 16, taps 8 and 16, taps 9 and 15, taps 9 and 18, taps 11 and 13, taps 11 and 14, and taps 13 and 14.

14. The apparatus, as recited in claim 9, wherein the scrambler circuit scrambles, concurrently with the scrambling of the plurality of data bits, at least one additional plurality of data bits associated with at least one additional bit-time subsequent to the first bit-time, based at least in part on individual ones of the plurality of distinct combinations of one or more taps of the LFSR corresponding to the additional bit-time, the additional plurality of data bits being scrambled for transmission during the additional bit-time on corresponding ones of the plurality of adjacent communications paths.

15. An apparatus comprising:
  means for coupling a first integrated circuit to a plurality of adjacent communications paths;
  means for scrambling a plurality of data bits for transmission on corresponding ones of the plurality of adjacent communications paths substantially minimizing a probability that worst case data patterns occur on the plurality of adjacent communications paths with respect to individual ones of the plurality of adjacent communications paths being victims of crosstalk from others of the plurality of adjacent communications paths.

16. The apparatus, as recited in claim 15, wherein the means for scrambling scrambles a plurality of data bits based at least in part on respective ones of a plurality of distinct combinations of one or more taps of a linear feedback shift register (LFSR), the plurality of data bits being scrambled for transmission during a first bit-time on corresponding ones of a plurality of adjacent communications paths.

17. The apparatus, as recited in claim 15, wherein the means for scrambling scrambles a plurality of data bits based at least in part on respective outputs of a plurality of instantiations of a linear feedback shift register (LFSR) polynomial function, individual instantiations of the LFSR being initialized with respective ones of a plurality of distinct seed values.

18. The apparatus, as recited in claim 15, further comprising:
  means for recovering the plurality of data bits from a signal generated by the means for scrambling.

19. The method, as recited in claim 1, further comprising:
  transmitting to the descrambling circuit from a scrambling circuit during the first bit-time scrambled versions of the plurality of data bits in parallel on corresponding ones of a plurality of adjacent communications paths.

20. The method, as recited in claim 1, further comprising:
  receiving in parallel a plurality of scrambled versions of the plurality of data bits on the corresponding ones of a plurality of adjacent communications paths; and
  descrambling the plurality of scrambled versions of the plurality of data bits, thereby recovering the plurality of data bits.

21. A method comprising:
  scrambling a first data bit based on a first set of taps of a linear feedback shift register (LFSR) to generate a first scrambled data bit, the first data bit being scrambled for transmission to a first descrambler during a first bit-time on a first communications path; and
  scrambling a second data bit based on a second set of taps of the LFSR to generate a second scrambled data bit, the second set of taps being different from the first set of taps, the second data bit being scrambled for transmission to a second descrambler and in parallel with transmission of the first scrambled data bit during the first bit-time on a second communications path, the second communications path being adjacent to the first communications path;
  scrambling a third data bit based on a third set of taps of the LFSR, the third set of taps being different from the first and second sets of taps, the third data bit being scrambled for transmission during a second bit-time on the first communications path; and
  scrambling a fourth data bit based on a fourth set of taps of the LFSR, the fourth set of taps being different from the first, second, and third sets of taps, the fourth data bit being scrambled for transmission during the second bit-time on the second communications path, wherein the first, second, third, and fourth data bits are scrambled concurrently,
  during the first bit-time, transmitting the first and second scrambled data bits in parallel over the first and second communications paths, respectively; and
  during the second bit-time, transmitting the third and fourth scrambled data bits in parallel over the first and second communications paths, respectively.

22. The apparatus, as recited in claim 9, further comprising:
  a plurality of transmitter circuits operative to transmit to a corresponding plurality of receiver circuits coupled to respective descrambler circuits scrambled versions of the plurality of data bits in parallel on corresponding ones of a plurality of adjacent communications paths.

* * * * *